Oct. 15, 1957 H. J. BORN 2,809,815
SCRAPED SURFACE CHILLER
Filed Dec. 20, 1954 2 Sheets-Sheet 1

INVENTOR.
H. J. BORN
BY
*Hudson & Young*
ATTORNEYS

INVENTOR.
H. J. BORN

United States Patent Office 2,809,815
Patented Oct. 15, 1957

2,809,815
SCRAPED SURFACE CHILLER

Harold J. Born, Bartlesville, Okla., assignor to Phillips Petroleum Company, a corporation of Delaware Application December 20, 1954, Serial No. 476,535

6 Claims. (Cl. 259—109)

This invention relates to an improved scraped surface chiller. In a more specific aspect, this invention relates to an improved spring-supported scraper for a scraped surface chiller.

Scraped surface chillers are used in a variety of applications for chilling many liquids, notably hydrocarbons, in order to precipitate out solid materials. In some cases, the chiller is used to cool the liquid and freeze from it solid material which settles out readily at the colder temperature. In other cases, a scraped surface chiller is an element in a system for separating liquids by means of fractional crystallization. In the latter case, the liquids fed to the chiller are cooled to a temperature at which at least a portion of one component precipitates out as crystals. Thereafter, the crystal slurry is fed to a crystal purification means.

In all of the uses for scraped surface chillers, a problem exists with respect to the load which is exerted by the precipitated solid material on the scraper therein. Where the chiller is used merely to cool a liquid so as to precipitate a small amount of material, the load on the scraper within the chiller can become excessive when the operation is shut down for a period of time and the material freezes in a thick layer on the inner wall of the chiller. In the case where a chiller is used as an element in a fractional crystallization process and a relatively large amount of solid material must be handled by the scraper in normal operations, the problem of overloading the scraper is more important and more troublesome. In these systems, the scrapers are carried by scraper springs and the scraper springs within the chiller must not be so stiff as to cause hte scraper blades to ride too heavily on the inner wall of the chiller, or the inner wall of the chiller becomes worn and scored during normal operation. In all of these uses of a scraped surface chiller the main function of the scraper is to clean the inner wall of the chiller so as to maintain an optimum coefficient of heat transfer therethrough.

Scraped surface chillers are known in the art which provide a resilient or flexible support for the scraper blade in order to prevent undue wear of the inner surface of the chiller. However, in the operation of a fractional crystallization process, such a flexibly supported scraper blade has been found to be unsatisfactory under conditions of excessive load. Variations in the composition of the feed mixture entering the chiller cause variations in the solids content of the crystal slurry produced therein. Thus, it has been found that the flexible members which support the scraper within the chiller have been damaged to the extent that they had to be replaced due to excessive stress during overloading of the chiller.

A scraped surface chiller, such as I have described herein above, has been in use in a commercial plant for the production of para-xylene from a liquid mixture of isomeric $C_8$ alkyl benzenes. In this process, the liquid feed mixture is cooled to a temperature in the neighborhood of about $-57°$ to about $-58°$ C. in the chiller to produce a crystal slurry. In normal operation, there is about 15 to 20 weight percent para-xylene in the liquid feed and a crystal slurry is produced in the chiller having about 10 to 15 percent solids by weight. The average feed mixture contains about 17 percent para-xylene and about 14 percent solids are produced in the chiller. However, when the feed mixture varies in composition or flow rate, or the refrigerating system varies to cool the feed mixture lower than is normal, or for any other reason, the chiller operates to produce a greater amount of solids than about 15 weight percent, there is an excessive surge of weight or load applied to the scrapers and it has been my experience on several occasions that the resilient or flexible members supporting the scrapers must be replaced when such an overloading occurs.

It is an object, therefore, of the invention to provide an improved scraped surface chiller.

It is a further object to provide an improved spring-supported scraper means for a scraped surface chiller.

It is a further object to provide a scraped surface chiller which can handle excessive amounts of solid material without damage to the scraper.

In accordance with this invention, an improved scraped surface chiller is provided which comprises a scraper blade attached by means of a resilient arm to a mounting means wherein the improvement comprises a resilient member secured adjacent one end to the mounting means, with its other end being spaced from said resilient arm and being positioned between said arm and said mounting means. In a preferred embodiment, the resilient member is secured adjacent one end to the mounting means at a place between the mounting means and the arm. More specifically, the invention provides an improved scraped surface chiller which comprises a rotatable shaft, a scraper blade extending longitudinally of the shaft, a resilient scraper arm or spring secured adjacent one end thereof to the shaft, and a resilient member secured adjacent one end thereof to the shaft between said scraper spring and shaft, its other end being free, spaced from said scraper spring and positioned between said spring and said shaft. The resilient member which is the essence of the present invention prevents damage to the scraper spring when an excessive load is applied to the scraper and, being normally spaced from the scraper spring, the resilient member does not add to the stiffness of the scraper spring during normal operation and, therefore, does not cause the scraper to damage or score the inner wall of the chiller.

A more complete understanding of this invention will be obtained upon study of the accompanying drawings, in which.

Figure 1:
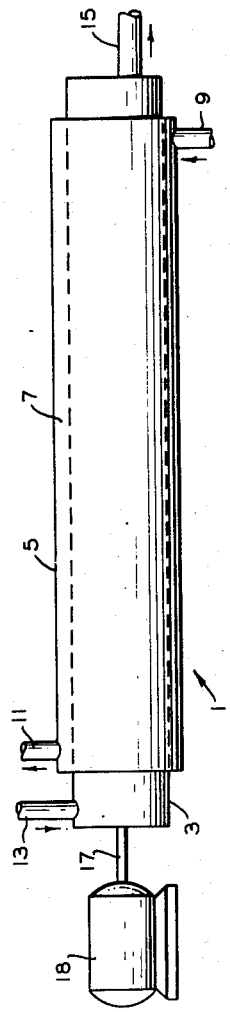
Figure 1 is an elevation of a scraped surface chiller.

Referring now to Figure 1, there is shown a double pipe scraped surface chiller 1, comprising an inner cylindrical chamber 3 which is concentrically disposed within and spaced from an outer cylindrical chamber 5. An annulus 7 is thus formed between chambers 3 and 5 through which any conventional refrigerating medium is passed via pipes 9 and 11. A liquid to be chilled, such as a liquid mixture of $C_8$ alkyl benzenes, is introduced to chamber 3 via a pipe 13 and the crystal slurry produced in chamber 3 is conveyed out the opposite end of chamber 3 via a pipe 15. The crystal slurry produced in chamber 3 is cleaned from the walls of chamber 3 by a spring-supported scraper means, illustrated more completely in Figures 2, 3 and 4 and which comprises an axially-disposed shaft 17 rotated by a motor driven means 18.

Figure 2:
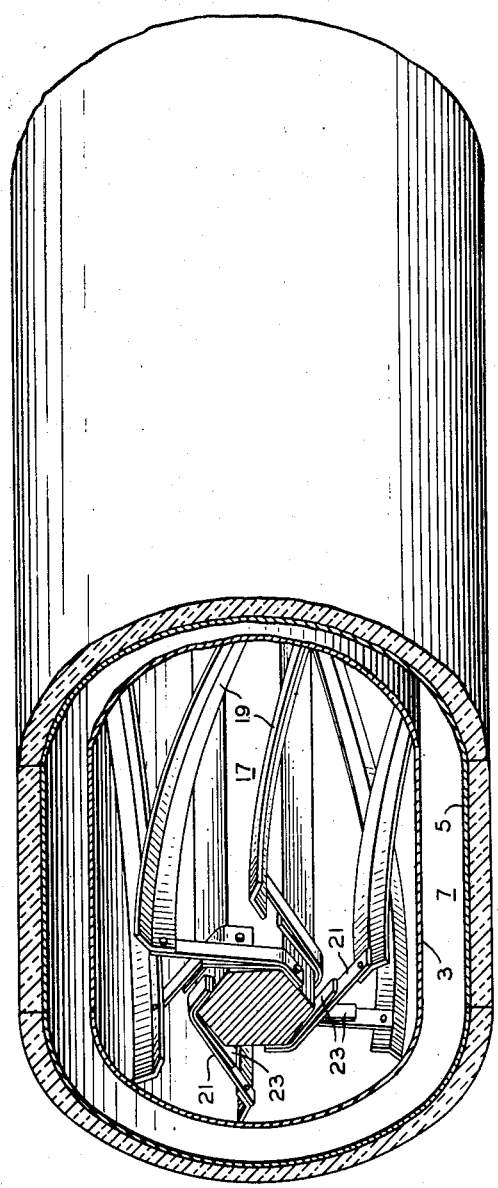
Figure 2 is a partial perspective view of the improved spring-supported scraper means of this invention.

Referring now to Figure 2, the improved spring-supported scraper means of this invention is shown. Shaft 17 is shown in its preferred embodiment which is a hexagonal shaft. Six scraper blades 19 extend longitudinally of shaft 17 and are spaced therefrom. A resilient scraper blade spring or arm 21 is secured adjacent one end to one face of the hexagonal shaft 17. Arm 21 is bent in an angle so that it extends in a direction so that its free end trails with respect to the direction of rotation of shaft 17. There are a plurality of such flexible arms, six being shown, one attached to each face of shaft 17 and six scraper blades 19, each secured to the free end portion of one of scraper springs 21. Blades 19 are shown as spiral blades which, in some measure, assist the passage of a crystal slurry through the chiller. In other embodiments, blades 19 are often straight, however.

In accordance with this invention, a resilient member 23 is secured adjacent one end thereof to a face of hexagonal shaft 17 at a point between scraper spring 21 and shaft 17. Resilient member 23 is shorter than scraper spring 21 and is bent in a smaller angle than the angle in which spring 21 is bent. Resilient member 23 also extends in such direction that its free end trails member 21 with respect to the direction of rotation of shaft 17. In the specific embodiments shown, there are a plurality of the resilient members 23, each being secured at one end to one face of hexagonal shaft 17.

Figure 3:
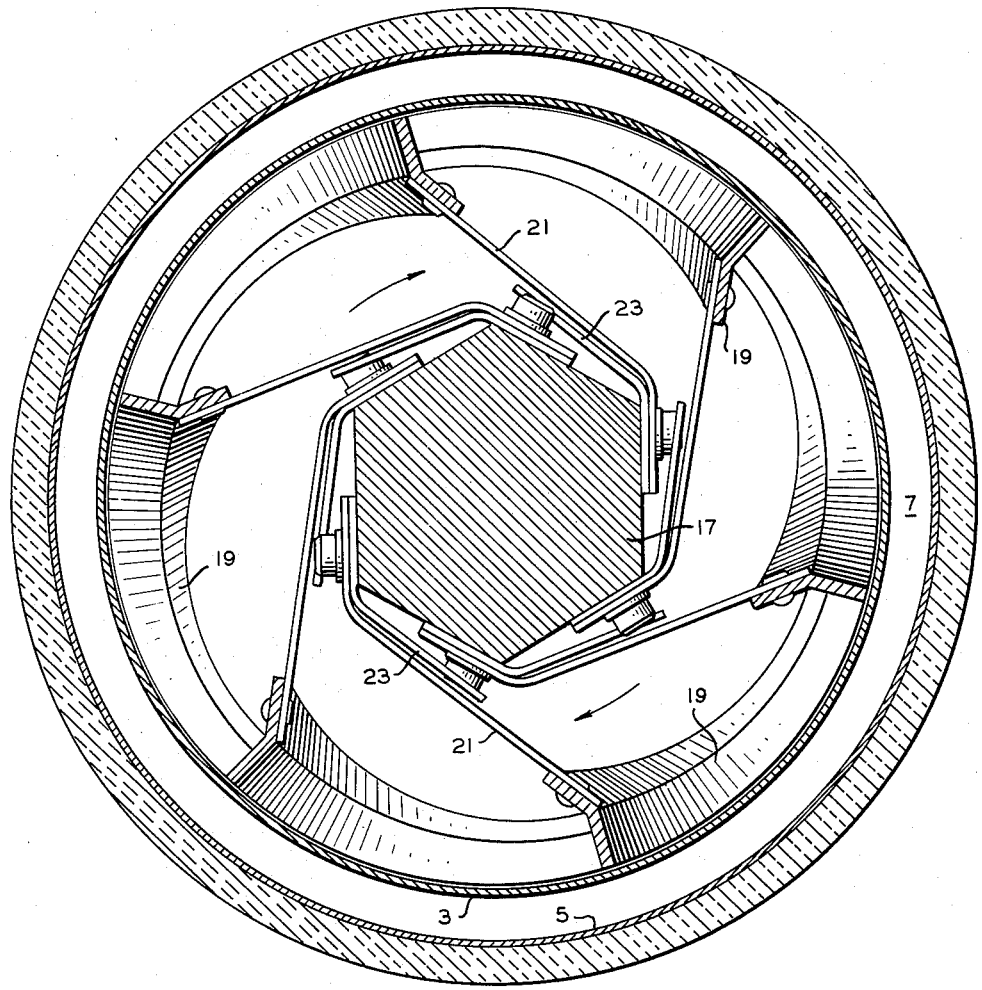
Figure 3 is an end view of the improved spring-supported scraper means of this invention.

Referring now to Figure 3, the elements of the improved spring-supported scraper means described in connection with Figure 2 are given the same numerals as in Figure 2. It will be observed that, as shaft 17 rotates in a clockwise direction, as indicated by the arrow, scraper blades 19, supported by the scraper springs 21, work against the solid material within inner chamber 3. In the event that an excessive amount of solid material is produced within the chiller, the scraper blades 19 and supporting springs 21 are pushed backwardly with respect to the direction of rotation of shaft 17 and away from the inner wall of chamber 3. In the commercial plant referred to hereinbefore, the scraper springs have been so distorted under conditions of excessive load, that they had to be replaced. However, in accordance with this invention, when springs 21 have been forced backwardly a short distance, the resilient members 23 give additional support and strength to scraper springs 21 and prevent them from being permanently distorted and damaged due to the overloading condition.

Figure 4:
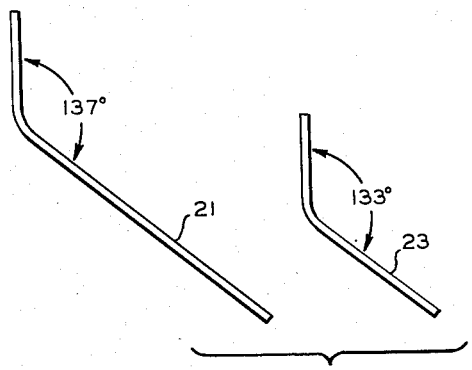
Figure 4 shows the relationship between the shapes of scraper spring 21 and resilient member 23 in a preferred embodiment of the invention.

Referring now to Figure 4, the relationship between the shape of scraper springs 21 and resilient members 23 is shown. In the commercial plant for the production of para-xylene by fractional crystallization of a liquid feed of C8 alkyl benzenes to which reference has been made, the improved solid material conveying means of this invention has been installed and there have been no shutdowns due to distorted or damaged scraper blades. The installation of this invention at this plant comprises a scraper spring 21 which is bent in an angle of 137° and a resilient member 23 which is shorter than spring 21 and which is bent in an angle of 133°, as is shown in Figure 4. In this installation, springs 21 and resilient members 23 are formed of 18 gauge, ½ hard, 2 percent beryllium copper alloy.

It should be noted that many variations in the specific arrangement of scraper spring 21, shaft 17 and resilient member 23 can be made wherein the essence of the present invention is utilized. Thus, the advantages of the invention are obtained as long as under normal or relaxed conditions the free end of the resilient member 23 is spaced from scraper spring 21 and positioned between spring 21 and shaft 17. It should be noted, further, that this invention can be applied equally to scraped surface chillers wherein the scraper blades are straight instead of spiral as illustrated in the drawings. In the former, the conveying action of the scraper blades is secondary but these blades are subjected to overloading as well.

It will be apparent to those skilled in the art that various modifications of this invention can be made upon studying the accompanying disclosure. Such modifications are believed to be clearly within the spirit and scope of this invention.

I claim:

1. In a spring-supported scraper means comprising a scraper blade attached by means of a resilient arm to a mounting means, the improvement which comprises, a resilient member independent of said scraper blade secured adjacent one end to said mounting means, the other end of said member being spaced from said arm and being positioned between said arm and said mounting means.

2. In a spring-supported scraper means comprising a rotatable shaft, a blade extending longitudinally of said shaft and spaced therefrom, a resilient arm secured adjacent one end to said shaft, said blade being secured to the free end portion of said arm, the improvement comprising, a resilient member independent of said blade secured adjacent one end to said shaft, the free end of said member being spaced from said arm and being positioned between said arm and said shaft.

3. A spring-supported scraper means comprising, a rotatable shaft, a blade extending longitudinally of said shaft and spaced therefrom, a resilient arm secured adjacent one end to said shaft, said blade being secured to the free end portion of said arm, and a resilient member independent of said blade secured adjacent one end to said shaft between said arm and said shaft, the free end of said member being spaced from said arm and being positioned between said arm and said shaft.

4. A scraped surface chiller spring-supported scraper means comprising, a rotatable shaft, a blade extending longitudinally of said shaft and spaced therefrom, a resilient arm secured adjacent one end to said shaft, said arm being bent in an angle to extend in such direction that its free end trails with respect to the direction of rotation of said shaft, said blade being secured to the free end portion of said arm and having its working edge directed outwardly, and a resilient member independent of said blade secured adjacent one end to said shaft between said arm and said shaft, said member being shorter than said arm and being bent in a smaller angle than said angle in which said arm is bent so that the free end of said member is spaced from said arm and so that the free end of said member is positioned between said arm and said shaft, said member also extending in such direction that its free end trails with respect to the direction of rotation of said shaft.

5. A scraped surface double pipe chiller comprising, an axially-disposed, rotatable shaft within the inner pipe of said chiller, a plurality of scraper blades extending longitudinally of said shaft and spaced therefrom, a plurality of resilient arms each secured adjacent one end to said shaft, each arm being bent in an angle so as to extend in such direction that the free ends of said arms trail with respect to the direction of rotation of said shaft, each of said scraper blades being secured to the free end portion of one of said arms, each of said blades having its working edge directed outwardly, and a plurality of resilient members independent of said scraper blade, each of said resilient members being secured adjacent one end to said shaft between one of said arms and said shaft, said members being shorter than said arms and being bent in an angle which is smaller than said angle in which said arms are bent so that the free ends of said members are spaced from said arms, each of said member free ends being positioned between one of said arm free end portions and said shaft, said members also extending in such direction that their free ends trail with respect to the direction of rotation of said shaft.

6. A scraped surface double pipe chiller comprising, an axially-disposed, hexagonal, rotatable shaft within the inner pipe of said chiller, six spiral ribbon blades extending longitudinally of said shaft and spaced therefrom, a plurality of resilient arms each secured adjacent one end to one face of said hexagonal shaft, each arm being bent in an angle so as to extend in such direction that the free end of said arm trails with respect to the direction of rotation of said shaft, each of said blades being secured to the free end portion of one of said arms and each of said blades having its working edge directed outwardly, and a plurality of resilient members independent of said blades, each of said resilient members being secured adjacent one end thereof to one face of said hexagonal shaft between one of said arms and said shaft, said members being shorter than said arms and being bent in an angle which is smaller than said angle in which said arms are bent so that the free ends of said members are spaced from said arms, each of said member free ends being positioned between one of said arm free end portions and said shaft, said members also extending in such direction that their free ends trail with respect to the direction of rotation of said shaft.

References Cited in the file of this patent

UNITED STATES PATENTS

| | | |
|---|---|---|
| 1,352,576 | Brecht et al. | Sept. 14, 1920 |
| 2,182,712 | Vogel | Dec. 5, 1939 |
| 2,646,974 | Read | July 28, 1953 |

FOREIGN PATENTS

| | | |
|---|---|---|
| 434,603 | Great Britain | Sept. 5, 1935 |